United States Patent Office 2,851,473
Patented Sept. 9, 1958

2,851,473

PROCESSES FOR THE REACTION OF SILANIC HYDROGEN-BONDED COMPOUNDS WITH UNSATURATED HYDROCARBONS

George H. Wagner, Clarence, and William G. Whitehead, Jr., Kenmore, N. Y., assignors to Union Carbide Corporation, a corporation of New York No Drawing. Application December 23, 1955
Serial No. 554,938

16 Claims. (Cl. 260—448.2)

This invention relates in general to improved methods or processes for the production of organosilicon compounds, i. e., organic derivatives of silicon containing carbon to silicon bonds. More particularly, the invention contemplates the provision of unique syntheses for promoting reactions between silane compounds of the type containing at least one silanic hydrogen bond ($\equiv$Si—H), with unsaturated hydrocarbons, wherein the reactions are catalyzed by means of a new and improved form of heterogeneous or multicomponent catalyst consisting of platinum and gamma alumina.

It has been proposed heretofore (U. S. 2,632,013 to Wagner and Strother) to catalyze the reactions between ethylenic or acetylenic hydrocarbons and silanes containing silanic hydrogen, by means of platinum, platinum black, platinized silica gel, or platinized asbestos. It is also known (U. S. 2,637,738 to Wagner) that platinum supported on finely-divided charcoal provides an active and selective catalyst for the addition of silanes of the general class described to aliphatic unsaturated compounds. While these known forms of catalysts are, for the most part, effective for the purpose intended, our investigations have demonstrated that in at least certain reactions of the generic class defined they are either without effect or are readily susceptible to poisoning or so-called "catalytic fatigue," becoming stopped-off, so to speak, thereby necessitating intermittent regeneration through the addition of further quantities of catalyst. It is presumed that this failure of the relatively cheaper and, therefore, preferred multicomponent catalysts, such as the charcoal-supported platinum catalyst, is influenced in some unknown manner by the charcoal support, possibly by reason of the formation of obstructive films due to a distorting action exercised by the carrier on the electric fields of the catalyst's active centers, since fatigue or poisoning of platinum, per se, is not necessarily induced under the same conditions of operation.

As a result of our detailed investigations of the aforementioned phenomena, we have found that a heterogeneous catalyst consisting of platinum deposited on the gamma allotrope of alumina not only avoids the fatigue factor characteristic of known catalysts when employed under the same conditions, but provides an outstandingly effective agent for catalysis, in general, of the reactions between the systems C=C or C$\equiv$C and Si—H, producing increased yields of the products of such reactions and permitting substantially continuous or flow-type operations at lower pressures and temperatures than have been possible heretofore.

The exact mechanism underlying the unique effectiveness of platinum-gamma alumina as a catalyst in reactions of the general class described is not known, but it is believed to be related in some manner to the cubic crystal structure of the gamma allotrope of alumina, since the alpha allotrope of alumina, which is hexagonal in crystal structure, when employed in conjunction with platinum in the form of a heterogeneous catalyst produces only normal or expected catalytic activity. While the gamma alumina component of our catalytic composition may be viewed in one sense as a carrier or support for the platinum component, the terms "carrier" and "support" actually denote an inert material which functions solely as a physical holder for a catalytic substance. It has been postulated that when a so-called "carrier" or "support" increases or decreases the rate of reaction during catalysis, or directs the rate of reaction in any manner, it is no longer simply a "carrier." In view of the unexpected results obtained through the use of gamma alumina in combination with platinum according to processes of our invention, and, in the absence of any proven scientific explanation of the mechanism underlying these results, we prefer to define the platinum-gamma alumina composition as a multicomponent or heterogeneous catalyst rather than a simple carrier-supported catalyst within the meaning assigned above. Apart from yielding a cheaper substitute for the unexposed mass of a plain platinum catalyst and the apparent protection from poisons afforded the platinum by the gamma alumina, the function of the gamma alumina with respect to the platinum remains unknown to us and the overall superiority of the catalyst, as will be developed more fully in the following passages, might well be due to a combination of factors including, for example, larger contact area or more equal distribution of the platinum, alteration of the adsorption characteristics and sensitivity to poisoning of the platinum, counteraction of loss of catalytic activity at higher temperatures, etc.

The gamma alumina component of the catalyst employed in the processes of the invention may be prepared in any suitable manner, such, for example, as by the thermal decomposition of ammonium alum, [Al$_2$(NH$_4$)$_2$(SO$_4$)$_4$· 24H$_2$O], at a temperature within the range 1000–1050° C., or by dehydration of aluminum hydroxide at a temperature within the range 900–1100° C., etc. The combined catalyst may be prepared in accordance with a number of different conventional procedures followed in the preparation of platinum catalysts in general. For our investigations, we employed a high purity (99.99+%) gamma alumina powder and formed a thick slurry with an aqueous solution of platinic chloride adjusted with respect to platinum content to provide the amount of platinum desired in the final product. The resulting slurry was dried at 110° C. and then heated at 500° C. in a reducing atmosphere (such as hydrogen or annealing gas) until the platinum content of the platinic chloride was reduced to the elemental state.

The utility of the platinum-gamma alumina catalyst in promoting reactions between silanes containing at least one silanic hydrogen bond and unsaturated hydrocarbons, appears to be general. Thus, the generic class of operative compounds may be defined by the following formula:

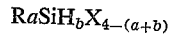

wherein $a$=0, 1, or 2;
$b$=1, 2 or 3;
$a+b$=4 or less;
R=a hydrocarbon group;

and

X=halogen or alkoxy.

Typical starting materials within the foregoing definition which may be employed in processes of the invention are the partially chlorinated silanes, such as, monochlorosilane (SiH$_3$Cl); dichlorosilane (SiH$_2$Cl$_2$); and trichlorosilane(SiHCl$_3$); alkyl- and alkoxy-substituted silanes and chlorosilanes, such as, methyl dichlorosilane

ethyl dichlorosilane ($C_2H_5SiHCl_2$); and triethoxysilane [$SiH(OC_2H_5)_3$,] etc. Typical unsaturated aliphatic compounds that may be employed in the processes of the invention are ethylene, acetylene, propylene, butenes, pentenes, and the like, as well as butadiene, cyclohexene, bicycloheptene, etc., and all similar compounds containing the groupings $>C=C<$ or $-C\equiv C-$.

Typical of the reactions catalyzed by the platinum-gamma alumina composition is the reaction between ethylene and dichlorosilane for the formation of diethyldichlorosilane, which it is believed, proceeds in accordance with the following equations:

(a) $C_2H_4 + H_2SiCl_2 \rightarrow C_2H_5SiHCl_2$, and (b) $C_2H_4 + C_2H_5SiHCl_2 \rightarrow (C_2H_5)_2SiCl_2$ For purposes of comparing the relative efficiency of platinum-gamma alumina as a catalyst, the foregoing reaction was conducted in a series of experiments utilizing the catalyst of the invention, platinized alpha alumina and a variety of other platinized ceramic carriers. Whereas the platinized alpha alumina and all other catalysts tested failed to induce ethylation, the platinum-gamma alumina produced excellent yields as shown in tabulated form in Table I below. In this series of experiments, 1.0 percent by weight of platinum was deposited on the respective carriers in conventional fashion and 0.1 gram of each of the resulting catalysts and 100 milliliters of liquid dichlorosilane were heated to 130° C. in a reaction vessel of 300 cc. capacity. Ethylene was then admitted to a partial pressure of 300 pounds per square inch (total pressure 600 p. s. i.) and the extent of reaction detected by ethylene absorption and temperature rise.

TABLE I

*Comparison of platinum-gamma alumina, platinum-alpha alumina, and other platinized ceramic carriers in the ethylation of dichlorosilane*

| Support | Observations |
| --- | --- |
| (1) Silica ("Si-O-Lite") | No reaction even after 1 hour at 1,000 p. s. i. |
| (2) "Bis Ethyl Gel" (a siloxane powder of high surface area). | Small initial reaction at 600 p. s. i. No further reaction at 1,000 p. s. i. |
| (3) Silicon oxyhydride | Same as (2) above. |
| (4) Alpha Alumina (high surface area). | Same as (2) above. |
| (5) 10% MgO—90% γ-$Al_2O_3$ (Spinel Boule Powder). | Moderate initial reaction which stops after 20 mins. at 900 p. s. i. At 150° C. and 1,100 p. s. i. almost complete ethylation takes place. |
| (6) Polyvinyl Siloxane Powder | Small initial reaction at 600 p. s. i. No appreciable further reaction at 170° C. and 1,000 p. s. i. |
| (7) Gamma Alumina | Very pronounced or strong reaction at 600 p. s. i. Self-sustaining. Complete ethylation in 25 minutes. |

Utilizing the same reaction between ethylene and dichlorosilane, a series of further tests were conducted under the same conditions described in connection with the reactions of Table I, which demonstrate quite effectively the very low concentrations of platinum required in the catalyst of the invention in order to obtain high yields at relatively lower pressures and temperatures and in shorter reaction times than have been possible heretofore with the conventional or standard forms of catalysts customarily employed in this general type of reaction. The results of these experiments are set forth in tabulated form in Table II below. It should be noted that these data also further demonstrate the ineffectiveness of platinum-alpha alumina as a catalyst in reactions of the general class described. In all of the experiments, 100 milliliters of liquid dichlorosilane and the respective catalysts were reacted with ethylene in a 300 cc. reactor.

TABLE II

*Reactions of dichlorosilane [1] and ethylene catalyzed with platinum-gamma alumina and platinum-alpha alumina*

| | Pressure, p. s. i. | | Temp., ° C. | | Time, Hr. | Product (Percent by Weight) | | |
| --- | --- | --- | --- | --- | --- | --- | --- | --- |
| | Start | Max. | Start | Max. | | $EtSiCl_3$ | $Et_2SiCl_2$ | $Et_3SiCl$ |
| 0.5 g. of 5.1% Pt-alpha-$Al_2O_3$ | 370 | 830 | 149 | 152 | 1.3 | | 90.6 | 2.3 |
| 0.5 g. of 4.8% Pt-gamma-$Al_2O_3$ | 420 | 700 | 151 | 228 | 0.3 | 7.1 | 90.4 | 2.4 |
| 0.1 g. of 4.8% Pt-gamma-$Al_2O_3$ | 400 | 700 | 149 | 202 | 0.5 | 7.2 | 91.7 | 2.5 |
| 0.1 g. of 4.8% Pt-gamma-$Al_2O_3$ | 300 | 600 | 132 | 208 | 0.4 | 5.8 | 93.4 | 2.2 |
| 0.1 g. of 1.0% Pt-gamma-$Al_2O_3$ | 280 | 630 | 132 | 205 | 0.3 | 4.4 | 93.8 | 1.4 |
| 0.2 g. of 0.05% Pt-gamma-$Al_2O_2$ | 280 | 850 | 134 | 172 | 0.8 | 4.8 | | |

[1] Containing small amounts of $HSiCl_3$ and $H_3SiCl$.

Of particular significance with respect to the data presented in the foregoing tables, and, characteristic of one of the more important advantages of the platinum-gamma alumina catalyst, is the fact that the reactions as catalyzed with this composition are completely self-sustaining. Heretofore, high dichlorosilane content alkylations could only be effected on a batchwise basis in autoclave-type reaction vessels wherein it is possible to make additions of catalyst, as, for example, platinized charcoal, to regenerate the reaction whenever it stopped due to catalytic fatigue or poisoning. The processes of the invention, on the other hand, may be effected in continuous or flow-type alkylation units owing to the unique catalytic properties of the platinum-gamma alumina catalyst. Furthermore, because of the higher reaction rates obtainable with our catalyst and the total absence of poisoning effects thereon, the completeness of the reactions obtained in the continuous-type units renders it unnecessary to recycle reactants in the manner practiced heretofore, thereby resulting in a substantial lowering of product cost.

The value of the platinum-gamma alumina catalyst in the continuous reaction of acetylene with trichlorosilane for the production of vinyltrichlorosilane has also been demonstrated. Thus, this reaction, as well as the corresponding ethylene reaction, when catalyzed with platinized charcoal frequently yield erratic results. It was found that this variation in activity is apparently a function of the amount of dichlorosilane present in the trichlorosilane used as a starting material in that reasonably good reactions were obtained when the dichlorosilane content of the trichlorosilane was less than one percent (1.0%), but poor results were obtained when the dichlorosilane content rose above this figure. Specifically, it was found that in the reaction as catalyzed with platinized charcoal, the presence of one percent (1.0%) or more of dichlorosilane in the trichlorosilane caused a decrease in conversion from fifty percent (50%) to twenty-five percent (25%). Upon substituting platinum-gamma alumina as catalyst in the reaction, these variations were completely eliminated and a marked increase in activity was obtained either in the presence of dichlorosilane or when the dichlorosilane content was very low (less than 1.0%). Conversions as high as ninety percent (90%) were obtained in the presence of one and three-tenths percent (1.3%) dichlorosilane in the tri-functional starting compound, when employing platinum-gamma alumina as catalyst. On the basis of these observations, it will be readily apparent that a further important advantage of the processes of the invention resides in the fact that crude trichlorosilane may be utilized in these reactions when catalyzed with platinum-gamma alumina, whereas formerly a good rectification was essential for high yields.

The results of the foregoing tests are summarized in Tables III and IV below. The equipment for these continuous flow reactions consisted of a vertical single-pass tubular reaction chamber (1.0″ x 20.0′) surrounded by an annular cooling jacket for temperature control, an agitator-type feed tank for the chlorosilane-catalyst suspensions, a compressor equipped with pressure and flow controls for the acetylene feed, and a simple collection tank for the reaction products. The conditions of reaction were essentially the same for both catalysts. The flow rate of the chlorosilane in the reactions catalyzed with platinized charcoal (Table III) was five to eight (5–8) gallons per hour, while a flow rate of five to twelve (5–12) gallons per hour was employed in the reactions catalyzed with platinum-gamma alumina (Table IV). Four (4) grams of platinized charcoal containing 1.0 percent by weight platinum, and three (3) grams of platinum-gamma alumina containing 1.0 percent by weight platinum were used per gallon of trichlorosilane reacted, except where noted otherwise. The reactions were conducted at a pressure of 350 pounds per square inch and at temperatures within the range 150–250° C., with ten percent (10%) nitrogen being used as diluent for runs with both catalysts, although subsequent tests demonstrated that this was not essential for the reactions catalyzed with platinum-gamma alumina. The tabulated data show that the percentage conversion of trichlorosilane to vinyltrichlorosilane ranged from twenty-five to sixty percent (25–60%) for platinized charcoal, as compared to sixty to ninety percent (60–90%) for platinum-gamma alumina.

A similar comparison was made between platinized charcoal and platinum-gamma alumina in the continuous reaction of ethylene with true mixtures of dichlorosilane and trichlorosilane and the results of these experiments are set forth in Tables V and VI below. The equipment and general procedure employed in these tests were the same as those described in connection with the acetylene reactions of Tables III and IV. The flow rate of the mixed chlorosilanes in the reactions catalyzed with platinized charcoal (Table V) was three to six (3–6) gallons per hour, while a flow rate of eight and one-half to fourteen (8.5–14) gallons per hour was employed in the reactions catalyzed with platinum-gamma alumina (Table VI). The separate platinized charcoal catalysts designated "A" and "B" in Table V, were a commercial product and a laboratory-prepared product, respectively, each containing five percent (5.0%) platinum, and both were employed at rate of four to five (4–5) grams per gallon of mixed chlorosilanes. The platinum-gamma alumina catalyst employed in the reactions of Table VI contained one percent (1.0%) platinum and was used at a rate of three (3) grams per gallon of mixed chlorosilanes. A wide range of pressures were employed, without success, in an attempt to obtain reactions with the platinized charcoal, whereas for the excellent reactions obtained with platinum-gamma alumina, the optimum pressure was found to be 750 pounds per square inch, although they are operative over a wide range of pressures. The initial temperature for both catalysts ranged between 150–160° C. with an ultimate range of only 150–190° C. for the platinized charcoal catalyzed reactions, indicating low heat of reaction, as compared to a rise in temperature up to 250° C., indicating excellent and rapid exothermic reaction, for the platinum-gamma alumina catalyzed reactions. As best seen by reference to the following tables, the yields of diethyldichlorosilane and ethyltrichlorosilane obtained using platinum-gamma alumina were as high as one hundred percent (100%), whereas no yield was obtained in any of the reactions catalyzed with the platinized charcoal catalysts.

TABLE III

Continuous flow reactions of acetylene and trichlorosilane catalyzed with platinized charcoal

| Run | Feed Purity in Mole Percent | | | Product Composition (Percent by Wt.) | |
|---|---|---|---|---|---|
| | $H_2SiCl_2$ | $HSiCl_3$ | $SiCl_4$ | $CH_2=CHSiCl_3$ | Heavies |
| 1 | 3.2 | 90.5 | 5.1 | 34.7 | 3.6 |
| 2 | | | | 24.4 | 5.1 |
| 3 | 3.3 | 97.2 | 1.1 | 37.8 | 2.0 |
| 4 | 1.6 | 97.0 | 1.7 | 37.4 | 3.4 |
| 5 | | | | 48.1 | 9.5 |
| 6 | 1.4 | 99.4 | | 26.6 | 2.2 |
| 7 | | 98.6 | 0.5 | 44.7 | 14.2 |
| 8 | 0 | 97.6 | 0 | 60.6 | 4.3 |
| 9 | | | | 60.8 | 3.2 |
| 10 | 0.4 | 97.6 | 0.9 | 38.6 | 19.8 |
| 11 | 0.4 | 99.1 | 0.9 | 34.1 | 15.5 |
| Averages | | | | [1] 45.0 | [1] 8.0 |

[1] Remainder unreacted lights.

TABLE IV

Continuous flow reactions of acetylene and trichlorosilane catalyzed with platinum-gamma alumina

| Run | Feed Purity in Mole Percent | | | Product Composition (Percent by Wt.) | |
|---|---|---|---|---|---|
| | $H_2SiCl_2$ | $HSiCl_3$ | $SiCl_4$ | $CH_2=CHSiCl_3$ | Heavies |
| 1 | 0.4 | 95.1 | 1.7 | 87 | 12 |
| 2 | 1.7 | 99.0 | | Trace | 42 |
| 3 | 0.9 | 97.7 | 0.8 | 60 | 35 |
| 4 | 1.1 | 96.6 | 1.3 | 79 | 18 |
| 5 | | | | 83 | 15 |
| 6 | | 96.0 | 1.8 | 58 | 24 |
| 7 | 4.3 | 93.6 | 2.1 | 81 | 15 |
| 8 | 2.6 | 93.5 | | 92 | 3 |
| 9 [1] | 2.1 | 98.5 | | 90 | 6 |
| Averages | | | | [2] 70 | [2] 19 |

[1] Catalyst rate halved (1.5 grs./gal. $HSiCl_3$).
[2] Remainder—unreacted lights.

TABLE V

Continuous flow reactions of ethylene and mixtures of dichlorosilane and trichlorosilane catalyzed with platinized charcoal

| Run | Catalyst | Feed Purity (Percent by Wt.) | | Conversion of (Percent)— | | |
|---|---|---|---|---|---|---|
| | | $H_2SiCl_2$ | $HSiCl_3$ | $H_2SiCl_2$ to $EtSiHCl_2$ | $H_2SiCl_2$ to $Et_2SiCl_2$ | $HSiCl_3$ to $EtSiCl_3$ |
| 1 | A | 55 | 45 | 0 | 0 | 0 |
| 2 | A | 55 | 45 | 0 | 0 | 0 |
| 3 | A+B | 55 | 45 | 23 | 0 | 0 |
| 4 | A+B | 55 | 45 | 9 | 0 | 0 |
| 5 | B | 55 | 45 | 31 | 0 | 0 |

TABLE VI

Continuous flow reactions of ethylene and mixtures of dichlorosilane catalyzed with platinum-gamma alumina

| Run | Feed Purity (Percent by Wt.) | | Conversion of (Percent)— | | |
|---|---|---|---|---|---|
| | $H_2SiCl_2$ | $HSiCl_3$ | $H_2SiCl_2$ to $EtSiHCl_2$ | $H_2SiCl_2$ to $Et_2SiCl_2$ | $HSiCl_3$ to $EtSiCl_3$ |
| 1 | 30 | 70 | 0 | 99 | 76 |
| 2 | 40 | 60 | 26 | 73 | 54 |
| 3 | 40 | 60 | 16 | 83 | 62 |
| 4 | 40 | 60 | 35 | 65 | 50 |
| 5 | 30 | 70 | 38 | 62 | 42 |
| 6 | 20 | 80 | 0 | 100 | 100 |

In addition to the foregoing data which illustrate the unusual activity of platinum-gamma alumina as a catalyst in the reactions for the formation of diethyldichlorosilane and vinyltrichlorosilane, excellent results have been demonstrated, also, in the following typical reactions, among others:

(A) $HC\equiv CH + C_2H_5SiHCl_2 \rightarrow (C_2H_5)(CH_2=CH)SiCl_2$
(B) $C_6H_5CH=CH_2 + C_2H_5SiHCl_2 \rightarrow$
$(C_2H_5)(\text{beta-}C_6H_5CH_2CH_2)SiCl_2$
(C) $HC\equiv CH + H_2SiCl_2 \rightarrow C_2H_3SiHCl_2 + (C_2H_3)_2SiCl_2$
$\qquad\qquad\qquad\qquad\quad (1) \qquad\qquad (2)$
(D) $C_3H_5Cl + HSiCl_3 \rightarrow ClCH_2CH_2CH_2SiCl_3 + C_3H_7SiCl_3$
$\qquad\qquad\qquad\qquad (1) \qquad\qquad\qquad (2)$ With reference to the foregoing Equations A–D, in Table VII below there are set forth data obtained in a series of static experiments involving these reactions which were conducted for purposes of further demonstrating the general utility of the platinum-gamma alumina catalyst in reactions between the systems Si—H and C=C or C≡C. The procedure employed in the reactions of Table VII consisted of mixing the catalyst and silicon derivative in a pressure vessel and adding the unsaturated organic reactant thereto at the respective pressures and temperatures indicated. Thereafter, the reaction vessel was cooled, vented, and the resulting products analyzed. The weight-percentage yields of products indicated in the right-hand column of Table VII do not show the relatively small quantities of lights, unreacted ingredients, and heavy fractions obtained, but these were included in calculating the yield figures.

On the other hand, in employing the platinum-gamma alumina catalyst in accordance with the processes of the present invention, the purity of the reaction product with respect to functionality is exactly the same as the purity of the starting compounds.

What is claimed is:

1. In a process for the production of organosilicon compounds that comprises reacting an unsaturated organic compound containing at least one non-aromatic multiple carbon to carbon bond with a silane containing at least one silanic hydrogen bond, the improvement that comprises catalyzing the reaction with platinum-gamma alumina.

2. In a process for the production of organosilicon compounds that comprises reacting an unsaturated hydrocarbon containing at least one non-aromatic multiple carbon to carbon bond with a silane containing at least one silanic hydrogen bond, the improvement that comprises catalyzing the reaction with platinum-gamma alumina.

3. In a process for the production of organosilicon compounds that comprises reacting a compound selected from the group consisting of unsaturated aliphatic hydrocarbons with a silane having the formula;

$$R_aSiH_bX_{4-(a+b)}$$

TABLE VII

*Reactions of Si-H and C=C or C≡C catalyzed with platinum-gamma alumina*

| Type of reaction (equations A-D) and Si-H Compound | Grs. of 1% Pt-Gamma Al$_2$O$_3$ | Unsaturated Organic Compound | Temp., °C. | Pressure, P.s.i. | Reaction Time, Hr. | Product (Percent by Wt.) |
|---|---|---|---|---|---|---|
| A<br>C$_2$H$_5$SiHCl$_2$ (400 cc.) | 0.1 | C$_2$H$_2$ | 95–100 | 200 | 1.3 | EtViSiCl$_2$ (86.7) |
| A<br>C$_2$H$_5$SiHCl$_2$ (400 cc.) | 1.0 | C$_2$H$_2$ | 60 | 80 | 1.3 | EtViSiCl$_2$ (74.3) |
| A<br>C$_2$H$_5$SiHCl$_2$ (600 cc.) | 1.5 | C$_2$H$_2$ | 80 | 80 | 1.5 | EtViSiCl$_2$ (78.8) |
| B<br>C$_2$H$_5$SiHCl$_2$ (904 g.) | 10.0 | C$_6$H$_5$CH=CH$_2$*<br>(styrene) (728 g.) | 200 | | 24 | Beta$\phi$EtSiCl$_2$ (75.5) 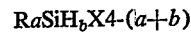 |
| C<br>H$_2$SiCl$_2$ (400 cc.) | 1.0 | C$_2$H$_2$ | 80 | 245 | 5 | ViSiHCl$_2$(41.4)<br>(ViSiHCl$_2$)$_n$(37.8)<br>Vi$_2$SiCl$_2$ (2.4) |
| C<br>H$_2$SiCl$_2$ (400 cc.) | 5.0 | C$_2$H$_2$ | 55–84 | 125–235 | 6 | ViSiHCl$_2$(39.0)<br>Vi$_2$SiCl$_2$(15.9)<br>(ViSiHCl$_2$)$_n$ (34.0) |
| C<br>H$_2$SiCl$_2$**(400 cc.) | 1.0 | C$_2$H$_2$ | 80 | 200–280 | 4 | ViSiHCl$_2$(38.4)<br>Vi$_2$SiCl$_2$(6.7)<br>Vi$_2$SiCl$_2$CH$_2$CH$_2$SiHCl$_2$(8.6)<br>(ViSiHCl$_2$)$_n$ (31.1) |
| D<br>HSiCl$_3$ (542 g.) | 2.0 | ClCH$_2$—CH=CH$_2$<br>(allyl chloride)<br>(306 g.) | 120 | 100–130 | 5 | C$_3$H$_7$SiCl$_3$(18.8)<br>ClC$_3$H$_6$SiCl$_3$(35.5) |

*Containing commercial inhibitor.
**Containing 4.8 g. di-tert.-butyl p-cresol.

It is interesting to note that activated charcoal as employed in the formation of platinized charcoal catalysts causes some disproportionation of silicon-hydrogen and silicon-chlorine bonds. Thus, when trichlorosilane is employed in reactions of the general class described which are catalyzed with platinized charcoal, some dichlorosilane as well as some silicon tetrachloride are produced. In the same manner, when dichlorosilane is used some trichlorosilane as well as some monochlorosilane are produced. We have found that such disproportionation does not occur when activated charcoal is absent provided, of course, that Friedel-Crafts type catalysts are also absent.

wherein,
$a = 0, 1$ or $2$
$b = 1, 2$ or $3$
$a + b = 4$ or less
R = a hydrocarbon group, and X is a member selected from the group consisting of halogen and alkoxy;
the improvement that comprises catalyzing the reaction with platinum-gamma alumina.

4. In a process for the production of organosilicon compounds that comprises reacting a compound selected from the group consisting of alkenes and alkynes with a silane containing at least one silanic hydrogen bond, the improvement that comprises conducting the reaction in the presence of platinum-gamma alumina, as catalyst.

5. In a process for the production of organosilicon compounds that comprises reacting a compound selected from the group consisting of alkenes and alkynes with a silane containing at least one silanic hydrogen bond, the improvement that comprises conducting the reaction in the presence of elemental platinum deposited on gamma alumina, as catalyst.

6. The process as claimed in claim 5, in which the catalyst consists of gamma alumina and 0.05 percent to 5.0 percent by weight of elemental platinum.

7. In a process for the production of organosilicon compounds that comprises reacting a compound selected from the group consisting of alkenes and alkynes with a silane containing at least one silicon-hydrogen bond and in which any valence of silicon not bonded with hydrogen is bonded with a member selected from the group consisting of halogen atoms and monovalent hydrocarbon radicals, the improvement that comprises conducting the reaction in the presence of platinum-gamma alumina, as catalyst.

8. In a process for the production of organosilicon compounds that comprises reacting a compound selected from the group consisting of alkenes and alkynes with a silane containing at least one silicon-hydrogen bond and in which any valence of silicon not bonded with hydrogen is bonded with a member selected from the group consisting of halogen atoms and monovalent hydrocarbon radicals, the improvement that comprises conducting the reaction on a continuous basis in the presence of platinum-gamma alumina, as catalyst.

9. In a process for the production of organosilicon compounds that comprises reacting a compound selected from the group consisting of alkenes and alkynes with a silane containing at least one silicon-hydrogen bond and in which any valence of silicon not bonded with hydrogen is bonded with a member selected from the group consisting of halogen atoms and monovalent hydrocarbon radicals, the improvement that comprises conducting the reaction in the presence of elemental platinum deposited on gamma alumina, as catalyst.

10. In a process for the production of organosilicon compounds that comprises reacting a compound selected from the group consisting of alkenes and alkynes with a substance selected from the group consisting of silanes and mixtures of silanes containing at least one silicon-hydrogen bond and in which any valence of the silicon not bonded with hydrogen is bonded with a member selected from the group consisting of halogen atoms and monovalent hydrocarbon radicals, the improvement that comprises conducting the reaction in the presence of elemental platinum deposited on gamma alumina, as catalyst.

11. In the process for the production of vinyl trichlorosilane involving the reaction of acetylene with trichlorosilane, the improvement that comprises conducting the reaction in the presence of platinum deposited on gamma alumina, as catalyst.

12. In the process for the production of vinyl trichlorosilane involving the reaction of acetylene with trichlorosilane, the improvement that comprises conducting the reaction on a continuous basis in the presence of platinum deposited on gamma alumina, as catalyst.

13. In the process for the production of organosilicon compounds that comprises reacting an unsaturated aliphatic hydrocarbon with trichlorosilane containing in excess of one percent by weight of dichlorosilane, the improvement that comprises catalyzing the reaction with platinum-gamma alumina.

14. In the process for the production of organosilicon compounds that comprises reacting an unsaturated aliphatic hydrocarbon with a mixture of trichlorosilane and dichlorosilane, the improvement that comprises catalyzing the reaction with platinum-gamma alumina.

15. In the process for the production of ethyl trichlorosilane and diethyldichlorosilane by reaction of ethylene with a mixture of dichlorosilane and trichlorosilane, the improvement that comprises catalyzing the reaction with platinum deposited on gamma alumina.

16. In the process for the production of ethyl trichlorosilane by reaction of ethylene and trichlorosilane, the improvement that comprises catalyzing the reaction with a catalyst consisting of platinum on gamma alumina.

References Cited in the file of this patent

UNITED STATES PATENTS

| | | |
|---|---|---|
| 2,632,013 | Wagner et al. | Mar. 17, 1953 |
| 2,637,738 | Wagner | May 5, 1953 |
| 2,658,028 | Haensel et al. | Nov. 3, 1953 |

FOREIGN PATENTS

| | | |
|---|---|---|
| 44,934 | Russia | Nov. 30, 1935 |

UNITED STATES PATENT OFFICE
CERTIFICATE OF CORRECTION

Patent No. 2,851,473 September 9, 1958

George H. Wagner et al.

It is hereby certified that error appears in the printed specification of the above numbered patent requiring correction and that the said Letters Patent should read as corrected below.

Column 6, line 33, for "up to $250°$ C." read -- up to $350°$ C. --; columns 7 and 8, Table VII, third column thereof, third line from the bottom, for "$ClCH_2-CH=3H_2$" read -- $ClCH_2-CH=CH_2$ --.

Signed and sealed this 12th day of July 1960.

(SEAL)
Attest:

KARL H. AXLINE
Attesting Officer

ROBERT C. WATSON
Commissioner of Patents